United States Patent
Meshchaninov et al.

(10) Patent No.: US 11,824,468 B1
(45) Date of Patent: Nov. 21, 2023

(54) ELECTROSTATIC FRICTIONAL PULSE GENERATOR

(71) Applicants: Mikhail Aleksandrovich Meshchaninov, Zhukovskiy (RU); Dmitrii Yanovich Agasarov, Krasnodar (RU); Anton Viktorovich Sergeev, Krasnodar (RU)

(72) Inventors: Mikhail Aleksandrovich Meshchaninov, Zhukovskiy (RU); Dmitrii Yanovich Agasarov, Krasnodar (RU)

(73) Assignees: Mikhail Aleksandrovich Meschchaninov, Zhukovskiy (RU); Dmitrii Yanovich Agasarov, Krasnodar (RU); Anton Viktorovich Sergeev, Krasnodar (RU)

( * ) Notice: Subject to any disclaimer, the term of this patent is extended or adjusted under 35 U.S.C. 154(b) by 0 days.

(21) Appl. No.: 18/221,022

(22) Filed: Jul. 12, 2023

Related U.S. Application Data

(63) Continuation of application No. PCT/IB2022/058934, filed on Sep. 21, 2022.

(30) Foreign Application Priority Data

Feb. 17, 2022 (RU) .......................... RU2022104158

(51) Int. Cl.
*H02N 1/04* (2006.01)
(52) U.S. Cl.
CPC ..................... *H02N 1/04* (2013.01)
(58) Field of Classification Search
CPC ....................................................... H02N 1/04
(Continued)

(56) References Cited

U.S. PATENT DOCUMENTS

| 2005/0021102 A1 | 1/2005 | Ignagni et al. |
| 2008/0208280 A1 | 8/2008 | Lindenthaler et al. |

(Continued)

FOREIGN PATENT DOCUMENTS

| CN | 1316615 A | 10/2001 |
| CN | 103204467 A | 7/2013 |

(Continued)

OTHER PUBLICATIONS

EA 012275 (Year: 2008).*

(Continued)

*Primary Examiner* — Ahmed Elnakib
(74) *Attorney, Agent, or Firm* — Bardmesser Law Group

(57) ABSTRACT

Electrostatic frictional generator has a movable member in form of flow of substance particles. The generator is a hollow cylinder and with a flow of air with substance particles along the cylinder surface. Materials of the cylinder and the substance are selected to provide induction of opposite electric charges on cylinder surface and on the substance particles due to friction of the substance particle flow against the cylinder surface. An electrode and a current collector connected to a load are located along axis of the cylinder with a gap between them. Means for providing the flow of air with substance particles has reflecting screens located in upper and lower portions of the cylinder, configured to repel flows of air with substance particles, and an axial fan located under the upper reflecting screen, which takes in air and has blades of smaller diameter than inner diameter of the cylinder.

19 Claims, 1 Drawing Sheet

(58) Field of Classification Search
USPC ........................................................ 310/310
See application file for complete search history.

(56) References Cited

U.S. PATENT DOCUMENTS

| | | |
|---|---|---|
| 2013/0318947 A1 | 12/2013 | Malik et al. |
| 2014/0142652 A1 | 5/2014 | Francois et al. |
| 2016/0067485 A1 | 3/2016 | Lindenthaler et al. |
| 2017/0191466 A1* | 7/2017 | Perez ........................ H02N 1/08 |
| 2020/0164207 A1 | 5/2020 | Meyyappan et al. |
| 2020/0318616 A1* | 10/2020 | Barton ........................ F03D 9/25 |
| 2021/0104906 A1 | 4/2021 | Wang et al. |
| 2022/0255466 A1* | 8/2022 | MacKenzie .............. H02N 1/08 |

FOREIGN PATENT DOCUMENTS

| | | |
|---|---|---|
| CN | 103368447 A | 10/2013 |
| CN | 205288095 U | 6/2016 |
| CN | 110995050 A | 4/2020 |
| EA | 012275 B1 | 8/2009 |
| ES | 2909949 A1 | 5/2022 |
| FR | 1237539 A | 7/1960 |
| GB | 516158 A | 12/1939 |
| JP | H08299747 A | 11/1996 |
| KR | 20080050318 A | 6/2022 |
| KZ | 24850 A4 | 11/2011 |
| RU | 2116244 C1 | 7/1998 |
| RU | 2122519 C1 | 11/1998 |
| RU | 12220 U1 | 12/1999 |
| RU | 61705 U1 | 3/2007 |
| RU | 2326487 C2 | 6/2008 |
| RU | 2410835 C1 | 1/2011 |
| RU | 122466 U1 | 11/2012 |
| RU | 2592085 C1 | 7/2016 |
| RU | 2741004 C1 | 1/2021 |
| RU | 2753275 C1 | 8/2021 |
| UZ | 5108 B | 4/2002 |
| UZ | 4426 C | 10/2011 |
| WO | 2012/044875 A1 | 5/2012 |

OTHER PUBLICATIONS

ES 2909949 (Year: 2022).*
CN 216518397 (Year: 2022).*
EP 2886464 (Year: 2015).*
Search report in PCT/IB2022/060911, dated Feb. 28, 2023.
Ecotechnics, Equipment for cleaning processes for industrial gases and liquids: A study guide / D.E. Smirnov (et al.); gen. ed. by L.V. Chekalov, A.V. Sugak.—Yaroslavl: YaGTU publ., 2013.—180 pages. ISBN 978-5-9914-0351-1.
Aristova N.A., Piskarev I.M., Ivanovskiy A.V., Selemir V.D., Spirov G.M., Shlepkin S.I., Initiation of chemical reactions by electrical discharge in dielectric-gas-liquid configuration // Physical Chemistry Journal, 2004, vol. 78, #7, pp. 1326-1331.
Piskarev I.M., Oxidation-reduction processes in water initiated by electrical discharge above water surface // General Chemistry Journal, 2001, vol. 71, Issue 10, p. 1622.
Search report in PCT/IB2022/058934, dated Dec. 15, 2022.
Search report in PCT/IB2022/058935, dated Dec. 22, 2022.
Search report in PCT/IB2022/058937, dated Dec. 15, 2022.
Search report in PCT/IB2022/060872, dated Mar. 2, 2023.
Search report in PCT/IB2022/060909, dated Mar. 2, 2023.
Rybka D. V. et al., Koronnyi razryad v vozdukhe atmosfernogo davleniya pri modul'nnom impul'se napryazheniya dlitel'nosti 10 ms (Coronal discharge in air of atmospheric pressure with modular voltage impulse of duration 10 ms), Optika atmosfery i okeana (Optics of atmosphere and ocean), 26, No. 1, 2013.

* cited by examiner

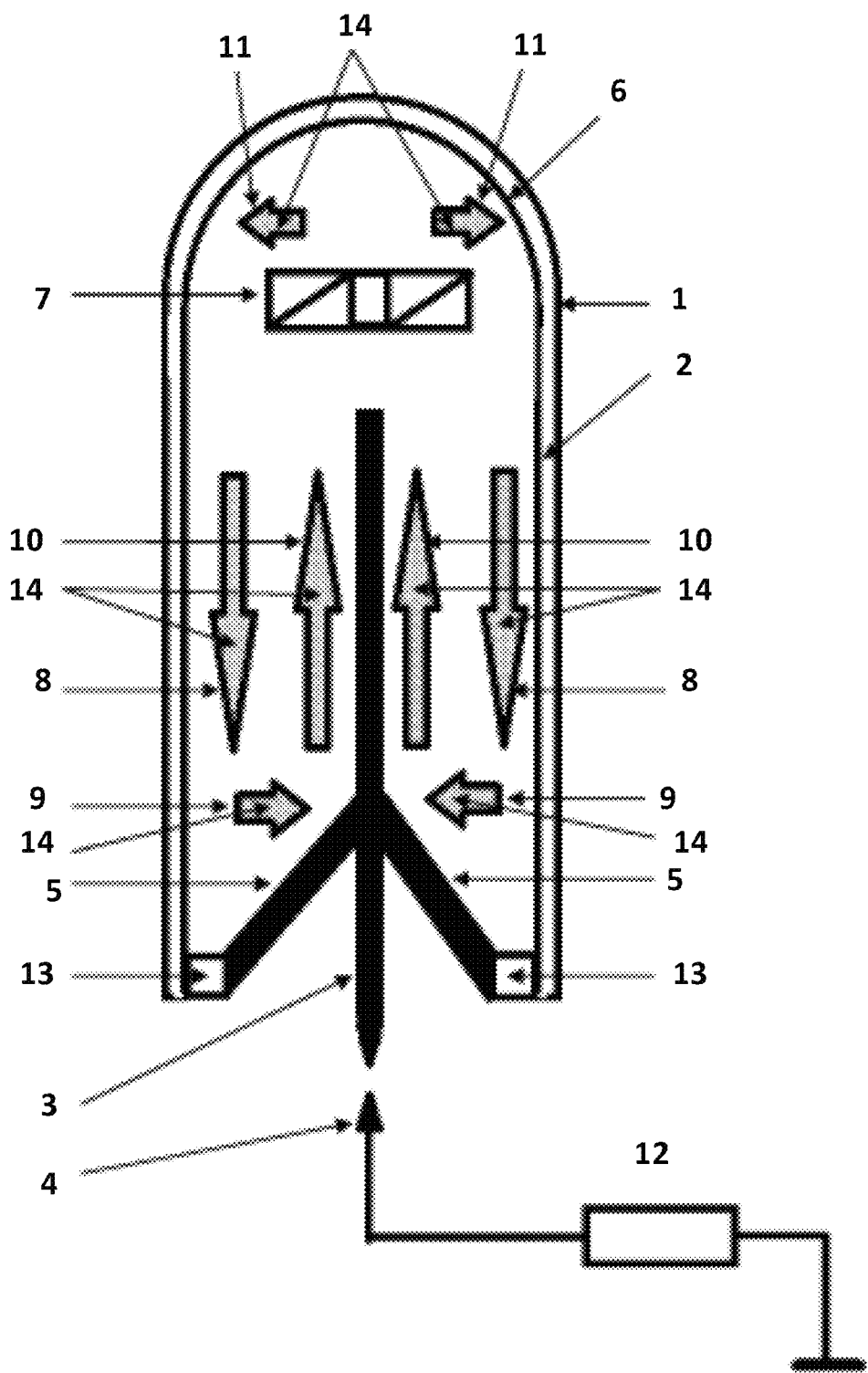

ELECTROSTATIC FRICTIONAL PULSE GENERATOR

FIELD OF THE INVENTION

The invention relates to electrostatic frictional generators having a movable member in form of flow of substance particles.

PRIOR ART

There is a known electrostatic frictional generator comprising a channel of finite length inside a tube, a means for providing flow of substance particles in the channel along axis thereof, current collectors for draining opposite electric charges, including a current collector in form of a screen for draining charge from the substance particles and a current collector for draining charge from inner wall of the channel, where the current collector is connected to a load at a portion near an input opening (patent application RU2006117750, published on Dec. 10, 2007). Material of the channel inner wall is selected so as to provide induction of opposite electric charges of the channel inner wall and the substance particles due to friction of the substance particle flow against the channel inner wall. A dielectric material, in particular a polymer material may be used as the material of the channel inner wall. The means for providing flow of substance particles may comprise a tank for storing and feeding the substance particles and a means for feeding gas with suspended substance particles into the input opening of the channel.

A drawback of the known device is that the electrostatic frictional generator is not able to operate in a pulsed mode.

SUMMARY OF THE INVENTION

The invention is directed to attaining a technical effect of providing an electrostatic frictional pulse generator having innovative configuration.

The technical effect is attained by an electrostatic frictional pulse generator implemented in form of a hollow cylinder and a means for providing a flow of air with substance particles along the cylinder surface. Material of the cylinder and material of the substance are selected so as to provide induction of opposite electric charges on the cylinder surface and on the substance particles due to friction of the substance particle flow against the cylinder surface. An electrode and a current collector connected to a load are spaced with a gap and located along axis of the cylinder. The means for providing the flow of air with substance particles is provided in form of screens located in upper and lower portions of the cylinder and configured to repel the flows of air with substance particles, and an axial fan located under the upper screen, which takes in air and has blades of smaller diameter than inner diameter of the cylinder.

Preferably, the hollow cylinder is equipped with a device for inputting the substance particles or air with substance particles into the inner cavity. Preferably, the hollow cylinder has round and straight shape. Preferably, a dielectric material is used as the cylinder material. Preferably, the electrode is provided in form of a metal rod. Preferably, the electrode has a sharpened or rounded tip directed to the current collector.

Preferably, the current collector is provided in form of a metal rod having a sharpened or rounded tip directed to the electrode. Preferably, the means for providing flow of substance particles along the cylinder surface assures the flow along inner surface of the cylinder. Preferably, the cylinder has two layers with a grounded outer metal shell. Preferably, the means for providing the flow of substance particles along inner surface of the cylinder is configured to simultaneously provide flow of substance particles in backward direction along the electrode after passing along inner surface of the cylinder.

Preferably, the hollow cylinder is positioned vertically. Preferably, the upper screen is solid.

Preferably, the upper screen is provided in form of a semi-sphere. Preferably, the upper screen is made of metal and grounded. In one embodiment, the lower screen is made solid.

Preferably, the lower screen is provided in form of a metal grill that is connected to the electrode and attached to the cylinder via an isolating member. Preferably, the metal grill of the lower screen is made of metal strips, which are directed radially and connected to the electrode. Preferably, plane of the metal strips is angularly oriented relative to surface of the lower screen grill. Preferably, the lower screen grill is provided in form of a cone.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 shows a schematic diagram of an electrostatic frictional pulse generator.

DETAILED DESCRIPTION OF EMBODIMENTS OF THE INVENTION

Reference will now be made in detail to the preferred embodiments of the present invention, examples of which are illustrated in the accompanying drawings.

FIG. 1 shows a schematic diagram of an electrostatic frictional pulse generator, where the following designators are used:

1—metal shell;
2—hollow cylinder;
3—electrode;
4—current collector;
5—lower screen in form of a cone grill;
6—upper screen in form of a semi-sphere;
7—intake axial fan;
8—flow of air containing substance particles 14, the flow directed along inner surface of cylinder;
9—flow of air containing substance particles 14, the flow directed along surface of lower screen;
10—flow of air containing substance particles 14, the flow directed along electrode;
11—flow of air containing substance particles 14, the flow directed along surface of lower screen;
12—load;
13—isolating members;
14—substance particles.

The electrostatic frictional pulse generator according to the invention is implemented as a device in form of a vertical hollow round and straight cylinder (2) filled with air containing substance particles (14). The cylinder (2) is made of a dielectric material with a grounded outer metal shell (1). An upper solid screen (6) provided in form of a grounded metal semi-sphere is attached to a top portion of the cylinder (2). A lower screen (5) provided in form of a cone grill is attached to a bottom portion of the cylinder (2). An electrode (3) is located along axis of the cylinder (2) and held in vertical position by the lower screen (5).

Material of the substance and material of the hollow cylinder are selected, based on fact of that, during friction of two chemically identical bodies, the most consistent one is charged positively. Metals are charged either positively or negatively during friction against a dielectric material. During friction of two dielectric materials, the most dielectrically permissive dielectric material is charged positively. Substances may be organized into triboelectric series, where the previous body is charged positively and the subsequent body is charged negatively (Faraday series: (+) furs, flannel, elephant ivory, feathers, quartz crystal, flint glass, cotton fabric, silk, timber, metals, sulphur (−)). Dielectric materials placed in triboelectric series show descent in hardness (Gezekhus series: (+) diamond (hardness of 10), topaz (hardness of 8), quartz crystal (hardness of 7), glossy glass (hardness of 5), mica (hardness of 3), calcite (hardness of 3), sulphur (hardness of 2), wax (hardness of 1) (−)). Metals are characterized by ascent in hardness.

The more surface of bodies in friction, the more electrostatic charging thereof is observed. Dust sliding over body surface is charged negatively, when the dust is formed of the same body (marble, glass, snow dust). Powders screened through a sieve are also charged.

Triboelectric effect in solid bodies is caused by transfer of charge from one body to another. Triboelectric effect in metals and semiconductors is caused by movement of electrons from a substance with lower work function (F) value to a substance with higher work function (F) value. During contact between a metal and a dielectric material, triboelectric effect is caused by movement of electrons from the metal to the dielectric material. During friction of two dielectric materials, triboelectric effect is caused by diffusion of electrons and ions.

Inner surface of the cylinder (2) is charged (e.g., positively) due to friction of a flow (8) of air containing substance particles (14) against the inner surface of the cylinder (2). After that, the air flow with (negatively) charged substance particles (14) forms a flow (9). The substance particles (14), during contact with the lower screen (5), transfer their charge to the lower screen (5) and the electrode (3) connected thereto. Further, the discharged substance particles (14) are dragged upwards along with a flow (10) by the intake axial fan (7). When voltage on the electrode (3) reaches a burst voltage value for a gap towards the current collector (4) and the (negative) charge induced on surface of the electrode (3) is transferred to the current collector (4) and used by a consumer in the load (12). After contacting the lower screen (5), the electrode (3) and the grounded upper screen (6), substance particles (14) lose their charge and, after repelling from the upper screen (6), they form a flow (11) of uncharged substance particles (14), which evolves into the flow (8). Further substance particles (14) are (negatively) charged again due to friction thereof against the inner surface of the cylinder (2). Cycle of rising voltage of the electrode (3) up to the burst value for the gap towards the current collector (4) is repeated. The cylinder (2) is charged up to a voltage so as draining current of the cylinder (2) material compensates charging current generated due to friction of the flow (8) of substance particles (14) against surface of the cylinder (2).

Thus, the technical effect of providing an electrostatic frictional pulse generator having innovative configuration is attained.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. An electrostatic frictional pulse generator comprising:
    a hollow cylinder filled with air containing substance particles; and
    means for providing a flow of the substance particles along a surface of the cylinder,
    wherein material of the cylinder and material of the particles provide induction of opposite electric charges on the surface of the cylinder and on the substance particles due to friction of the substance particle flow against the surface of the cylinder,
    wherein an electrode and a current collector connected to a load are located along a center axis of the cylinder and are spaced apart by a gap, and
    wherein the means for providing the flow of substance particles includes upper and lower reflecting screens located in upper and lower portions of the cylinder, respectively, and an axial fan located under the upper reflecting screen, wherein the axial fan takes in air and has blades of a smaller diameter than an inner diameter of the cylinder, and
    wherein the upper and lower reflecting screens are configured to repel flows of substance particles.

2. The electrostatic frictional pulse generator of claim 1, wherein the hollow cylinder receives the flow of substance particles into the cylinder.

3. The electrostatic frictional pulse generator of claim 1, wherein the hollow cylinder has a round and straight shape.

4. The electrostatic frictional pulse generator of claim 1, wherein the hollow cylinder is made of a dielectric material.

5. The electrostatic frictional pulse generator of claim 1, wherein the electrode is shaped as a metal rod.

6. The electrostatic frictional pulse generator of claim 5, wherein the electrode has a sharpened or rounded tip directed toward the current collector.

7. The electrostatic frictional pulse generator of claim 1, wherein the current collector is shaped as a metal rod having a sharpened or rounded tip directed to the electrode.

8. The electrostatic frictional pulse generator of claim 1, wherein the cylinder has a grounded outer metal shell.

9. The electrostatic frictional pulse generator of claim 1, wherein the means for providing a flow of substance particles along the surface of the cylinder provides the flow along an inner surface of the cylinder.

10. The electrostatic frictional pulse generator of claim 9, wherein the means is configured to provide a flow of substance particles in a backward direction along the electrode after passing forward along the inner surface of the cylinder.

11. The electrostatic frictional pulse generator of claim 1, wherein the hollow cylinder is positioned so that the electrode is oriented vertically.

12. The electrostatic frictional pulse generator of claim 1, wherein the upper reflecting screen is solid.

13. The electrostatic frictional pulse generator of claim 12, wherein the upper reflecting screen is shaped as a hemisphere.

14. The electrostatic frictional pulse generator of claim 13, wherein the upper reflecting screen is made of a metal and grounded.

15. The electrostatic frictional pulse generator of claim 1, wherein the lower reflecting screen is solid.

16. The electrostatic frictional pulse generator of claim 1, wherein the lower reflecting screen is provided in form of a metal grill that is connected to the electrode and isolated from the cylinder inner surface.

17. The electrostatic frictional pulse generator of claim 16, wherein the grill is made of metal strips, which are directed radially, connected to the electrode and attached to the cylinder via an isolating member.

18. The electrostatic frictional pulse generator of claim 17, wherein plane of the metal strips is angularly oriented relative to surface of the grill.

19. The electrostatic frictional pulse generator of claim 16, wherein the metal grill is shaped as a cone.

* * * * *